United States Patent [19]

vom Braucke et al.

[11] Patent Number: 5,630,601
[45] Date of Patent: May 20, 1997

[54] TWO-WHEELED TROLLEY WITH VERTICAL FRAME AND FOLDABLE SUPPORT WHEELS

[75] Inventors: Hans vom Braucke, Vlotho; Manfred vom Braucke, Bielefeld, both of Germany

[73] Assignee: Bielefelder Kuchenmaschinen- und Transportgerate-Fabrik vom Braucke GmbH, Bielefeld, Germany

[21] Appl. No.: 452,714

[22] Filed: May 30, 1995

[30] Foreign Application Priority Data

Jun. 20, 1995 [DE] Germany ............... 9409735 U

[51] Int. Cl.⁶ .................................... B62B 1/04
[52] U.S. Cl. ............... 280/40; 280/655; 280/47.29
[58] Field of Search ................... 280/39, 40, 42, 280/651, 652, 655, 659, 47.27, 47.29

[56] References Cited

U.S. PATENT DOCUMENTS

| | | |
|---|---|---|
| 3,043,603 | 7/1962 | Major, Sr. . |
| 3,241,852 | 3/1966 | Muller et al. ........................ 280/40 |
| 4,335,895 | 6/1982 | Walker . |
| 4,335,985 | 6/1982 | Kistler . |
| 5,439,739 | 8/1995 | Su .......................................... 280/40 |
| 5,468,005 | 11/1995 | Yang ..................................... 280/40 |

FOREIGN PATENT DOCUMENTS

| | | |
|---|---|---|
| 0352515 | 2/1993 | European Pat. Off. . |
| 1943253 | 7/1966 | Germany . |
| 1982824 | 4/1968 | Germany . |
| 217650 | 10/1941 | Switzerland . |

*Primary Examiner*—Richard M. Camby
*Attorney, Agent, or Firm*—Burns, Doane, Swecker & Mathis, L.L.P.

[57] ABSTRACT

A collapsible hand trolley includes a frame having manual gripping handles at its upper end, and a support plate at its lower end. A pair of wheel carriers is also mounted on the lower end of the frame. The trolley can be folded to a storage condition by pivoting the wheel carriers about generally vertical axes, and pivoting the support plate about a generally horizontal axis. When the wheel carriers have been unfolded to an operative position, a connection rod pivotably mounted to the frame is pivoted about a generally horizontal axis to a securing position between the wheel carriers in order to prevent the wheel carriers from moving to their folded positions.

21 Claims, 5 Drawing Sheets

TWO-WHEELED TROLLEY WITH VERTICAL FRAME AND FOLDABLE SUPPORT WHEELS

BACKGROUND OF THE INVENTION

The invention relates to a collapsible two-wheeled trolley or hand truck.

Such a trolley is known which comprises a vertical frame formed from a pair of longitudinal sections, the lower end of which has two wheel carriers provided with wheels and which are swivelable about generally vertical axes lying in the plane of the vertical frame. The wheel carriers can be swivelled out and secured by securing means. A shovel is provided as a means for supporting loads. The shovel can be swivelled about an additional swivelling axis which runs generally horizontally and perpendicular to the swivelling axes of the wheel carriers. The upper end of the frame is designed as a manual gripping end. The longitudinal sections of the vertical frame are connected together between the mobile frame and the gripping end and by at least one transverse bar, whereby the wheel carrier and shovel are coupled on the lower end of the corresponding longitudinal sections.

In many cases, small loads are to be transported simply and certainly with a simple transportation means that can also be transported with the load, for example goods for purchase from a car at home or in the scope of a recreational activity; for instance, in the preparation of a sailing mast for equipping a boat, many objects for the outfitting must be brought to the boat which cannot be reached by car. In these cases trolleys are suited for transporting materials. It is a necessity to be able to collapse the trolley to as flat and space-saving a condition as possible and to make the trolley as light-weight as possible for a private household as well as for taking such a trolley in the car or on board a boat or similar vehicle.

Light-weight trolleys which can be collapsed are known from U.S. Pat. No. 3,043,603. The trolley proposed there has a rigid vertical frame with a transverse link as a handle. On the lower end of the vertical frame a shovel is attached so that it can be swivelled about an axis lying transverse to the plane of the vertical frame. Wheel carriers necessary to roll the trolley are provided in the area of the lower end, which can be swivelled-in and have securing means which fix the wheel carriers in a swivelled-out position. The projections provided for this wheel-securing function which engage in an opening in the swivel sleeves of the wheel carriers may not, however, enable the required angled position of the wheel carriers to be adequately fixed for secure travelling, especially for long use. In addition, significant forces on the projection producing the securement are to be expected for this kind of fixing, with slight positioning forces affecting the wheels due to the large mechanical advantage, so that deformations in the area of the swivel sleeves hamper the ability to swivel the wheel carriers.

Another type of fixing of the wheel carriers is described in German Document GM-19 43 253; here, the wheel carrier is fixed with a locking pin. The trolley described in this publication has in addition a collapsible shovel blade and foresees the possibility to reduce the size of the vertical frame designed as a gripping frame by folding the frame. The shovel taking on the load is likewise foldably coupled on the vertical frame.

German Document GM-19 82 824 describes a very costly construction, in which the swivelling in of the wheels is combined with the folding of the handle portion of the pushing frame.

Additional trolleys, preferably for transporting travel bags, are described by U.S. Pat. No. 4,335,985 and Swiss Patent 217,650.

Finally, European Published Application No. 0 352 515 relates to a collapsible two-wheeled trolley for transporting small loads for private or recreational use, having a vertical frame built from a pair of longitudinal sections. The lower end of the vertical frame carries a mobile frame with two wheel carriers provided with a wheel and being swivelable about a generally vertical axis running in the plane of the vertical frame and that can be set in a swivelled-out condition by securing means. A shovel provided as a means for accepting loads can be swivelled about an additional swivelling axis which runs generally horizontally and perpendicular to the swivelling axes of the wheel carriers. The upper end of the vertical frame is designed as a gripping end. The longitudinal sections of the vertical frame are pivotably connected together at a location between the wheeled lower end and the gripping end to be divided into upper and lower sections, wherein the upper section can be folded over the lower section. The wheel carrier and shovel are coupled on the lower section. A lock is provided for securing the wheel carriers in the unfolded position. For these trolleys suited for (relatively) small loads, larger loads cause the wheel carriers to slip out of the locked position so that the trolley loses its maneuverability.

The object of the invention is to propose a further development of a trolley of the general type described above such that a safe transport of heavy loads is made ergonomically possible while maintaining the advantages, whereby the trolley can be converted from the rest position to the position of use, so that it takes up as little space as possible in the rest position and whereby the trolley itself can be economically manufactured.

SUMMARY OF THE INVENTION

In the invention, a connecting rod holding the distance between the wheel carriers is inserted such that it fixes these in their working position. The swivelled-out wheel carriers are clearly held tight in the working position, independently from any load, overbalancing, or similar force. A connecting rod inserted between the wheel carriers holds the swivelled-out wheel carriers forcibly in the operating position so that the wheel carriers are prevented from folding up, which would be possible under certain driving conditions. In this way it is possible without anything further to provide the wheel carriers with the securing for the wheel carriers disclosed in European Publication 0 352 515, which facilitates the unfolding of the trolley from the rest position into the working position; it is self-evident that the connecting rod must be swivelled in for the transport of smaller loads. At the same time, the connecting rod can be used as a "step" to be able exercise a counter pressure when tipping the trolley with the foot from the rest (storage) position into the working (driving) position. A distance between the axis of the wheels and the connection rod is advantageous for this, whereby the distance of the arrangement of the connection rod to the inner carrier prong of the wheel carrier corresponds to at least the distance of the axes of the wheels from the plane of the vertical frame. With the position for the connection rod provided "before" the axis, a distance is provided, which is advantageous for tipping, since tipping results about the wheel axis and so a certain levering arm is provided. The bigger this difference becomes, the more favorable the tipping momentum becomes, which is exercised on the trolley with a given force, to bring this out of the rest (storage) position into the working (driving) position.

Advantageously the connection rod can be swivelled about an axis lying perpendicular to the longitudinal section of the vertical frame, which are coupled on this for swivelling in between the wheel carriers about an axis perpendicular to the longitudinal profile of the vertical frame. In addition, the longitudinal sections in the area of their lower ends each have a socket for accepting extension arms, with which the connecting rod can be swivelled in between the wheel carriers. For this the connection rod has open ends opposite the inner carrier prong of the wheel carrier or opposite an arrangement connected with the carrier prong lying on the wheel carrier, whereby each of the inner carrier prongs is provided with a stopper accepting a corresponding open end and limiting the swivelling angle, with which a limitation of the swivelling angle is achieved so that the connection rod is held securely in its position and so that the position of the wheel carriers can also be assured.

The connection rods have for this open ends opposite the inner carrier prong or opposite an arrangement connected with the inner carrier prong on the wheel carrier, whereby each of the inner carrier prongs is provided with a stopper which accepts a corresponding open end. For this the open ends of the connection rod are connected with a fitting advantageously, which perhaps can be inserted in the stopper so that it interlocks. The limitation of the swivelling angle as well as the correct positioning of the connection rod is achieved with these stoppers. The fittings are designed in one embodiment as guide blocks and the stoppers as corresponding to these, whereby preferably the stoppers are provided with catching means. With the help of the guide block, a progressive securing of the positions is achieved, whereby the guide block is pressed into its opening. To secure it, means can be provided which secure the block in a wedge-shaped opening as a locking mechanism. In another embodiment the fittings are designed as cylindrical and the stoppers as corresponding to them, whereby preferably at least one of the two cylindrical fittings is provided with a guide pin and the stopper accepting this fitting is provided with a bore hole for inserting this guide pin. In a further development of this embodiment, the cylindrical stoppers which accept the ends surround this by at least 180°, whereby at least one of the walls of the stopper surrounding this end is designed as an elastically moldable wall. Through this design of the stopper, a sure holding of the cylindrical end of the connection rod is achieved and also a clamp which surrounds by more than 180°. It is also advantageous here when the stopper has a catching means to hold the connection rod. These catching means can be provided in a simple way by separating the elastically moldable wall part of the stopper from the inner wall of the prong carrier with a groove. This separated portion works like a spring which improves the elastic moldability and which provides the holding action; should the end of this separated part be provided with a projection and provided furthermore with a corresponding opening on the corresponding end of the connection rod, then the locking connection is formed in this way. In both cases the fittings are surrounded by the stoppers at least partially interlocking, whereby the guidance makes a frictional connection possible. The cylindrical design in the simplest case is the cylindrical ends of the connection rod turned to the outside, which are so cut into lengths such that their lengths correspond to the open distance between the two wheel carriers, whereby it goes without saying that stoppers that perhaps exist are to be considered. It is understood that on the open ends of the connection rod, openings are also provided, which work in cooperation with the projections, which are provided on the inner side of the carrier prongs of the wheel carriers. For this, the openings provided on the connection rod accept the projections on the wheel carriers perhaps interlocking and are also provided with catching means in an advantageous further development to hold and catch the projections.

As a further alternative, the connection rods are designed in such a way that their open ends are provided with openings, which cooperate with projections, which are provided on the inner side of the carrier prongs of the wheel carrier. In this way, these openings can be wedge-shaped or partially cylindrical, as already described, which accept the projections provided on the carrier prongs which have the corresponding forms. These openings are also advantageously provided with catching means for holding and catching the projections in the openings.

Independently from the design of this connection rod and its abutment to the wheel carriers, the wheel carriers are provided on their outer side with sliding frames for an advantageous embodiment; these sliding frames are designed in such a way that they extend over the wheels in swivelled-out position and thus allow a pushing or pulling of the trolley over impassable paths, such as steps. It is advantageous for this when each sliding frame is supported against the corresponding longitudinal section with its free end, whereby a swivelling casing for the sliding frame which encompasses the longitudinal section is provided, by which both sliding frames can be swivelled from the rest position into the working position. In this way an ability to swivel is achieved, which allows both sliding frames to swivel in the plane defined by the longitudinal sections. Since the working radius of the sliding frame approximately corresponds to the radius of the wheels which can be swivelled in between the longitudinal carriers, the sliding frames can be folded up with the wheel carriers nearly coplanar between the longitudinal carriers, so that this trolley designed in this way can also be collapsed. It is advantageous for this when the sliding frame is connected on the side of the wheel carrier in the area of the axis of the wheel on the wheel carrier or with a swivelling casing on the lower end of the corresponding longitudinal section. In this arrangement, the sliding frame and the connection rod can not hinder each other in use or in the rest position.

In a preferred design, the handles for pushing the trolley are designed as self-contained ring handles, which are arranged with a swivelling casing on the upper longitudinal section and can be swivelled about the axis of this longitudinal section. With this design it is achieved that the handles, which must also be designed to move heavy loads ergonomically, are designed to be able to swivel, which are formed as self-contained ring handles and stand opposing the direction of the pushing at an angle, which forms an angle of about 30° to 45° to the plane of the longitudinal section and an angle of 15° to 25° to the plane running perpendicular to each of the longitudinal sections. A coplanar folding with the trolley is possible through the swivelling of the handles; these handles are arranged on the upper end of the longitudinal section so they can swivel and can be swivelled in the space between the longitudinal sections, so that the coplanar folding of the trolley is achieved.

It is advantageous for this to hold the swivelling casing in position by a lower and an upper socket casing. Arresting means provide that the handles swivelled into the rest or working position can not be swivelled out of the end positions corresponding to these positions. These arresting means are formed, for one, from a locking projection on the front side of the swivelling case, which engages in a corresponding opening provided on the corresponding socket ring, whereby the swivelling casing is supported against the other of the two socket rings by means of an elastic flexible spacer, which delivers the play necessary for releasing the locking projection from the opening. For another, they are built from a stopping finger on the swivelling casing cooperating with a projection which extends radially on a socket ring, whereby the one as well as the other type of arresting as well as both together are used. The arresting with the projection and locking finger is used preferably to set the swivelling handle in the working position. For this the socket rings are set on the appropriate longitudinal section and in fact at a distance which corresponds to the length of the swivelling casing of the handle, with elastic flexibly spacer if needed.

In one of the preferred embodiments, both longitudinal sections are divided in an upper and a lower longitudinal section, which are flexibly connected with each other. The joint can be set by means of a locking means arranged in the joint area in the working position as well as the rest position. A locking bolt which prevents the movement of the joint when folded over but allows swivelling of one of the parts of the longitudinal sections over the other when unfolded, is suitable as a locking means. In this way, a trolley suitable also for the transport of heavy loads is obtained, which can be collapsed in two planes, so that the trolley swivelled together can be stowed in a space-saving manner, whereby this locking bolt prevents an unexpected unfolding of the trolley.

In another likewise preferred embodiment the swivelling casing of the sliding frame and the swivelling casing of the handle form an integral fitting; through this design, the handle and sliding frame form on every side a quasi one-piece unit and are swivelled out with a movement. It is advantageous for this when the handles are supported with an additional support against the longitudinal section, whereby the free ends of the additional supports are accepted by the swivelling casing provided on the longitudinal section. Since both the handles and sliding frame can be swivelled between the longitudinal section, an ability to collapse is produced, which makes it possible to store the trolley in a space-saving manner in the rest position.

BRIEF DESCRIPTION OF THE DRAWINGS

The objects and advantages of the invention will become apparent from the following detailed description of preferred embodiments thereof in connection with the accompanying drawings, in which like numerals designate like elements, and in which:

FIG. 3 depicts the connection rod with cylindrical end piece and fitting pin;

FIG. 3b depicts the stopper and side view sectioned along line 3b—3b in FIG. 3a;

FIG. 3c depicts the stopper in a transverse view, taken in the direction of arrow 3c in FIG. 3a;

FIG. 4b is a sectional view taken along line 4b—4b in FIG. 4a;

FIG. 5b is a sectional view taken along line 5b—5b in FIG. 5a;

FIG. 6a is a front view of the handle-swivel socket;

FIG. 6b is a sectional view taken along line 6b—6b in FIG. 6a;

FIG. 6c depicts the upper socket ring with swiveling casing;

FIG. 6d is a sectional view taken along line 6d—6d in FIG. 6a;

DETAILED DESCRIPTION OF PREFERRED EMBODIMENTS OF THE INVENTION

Figure 1:
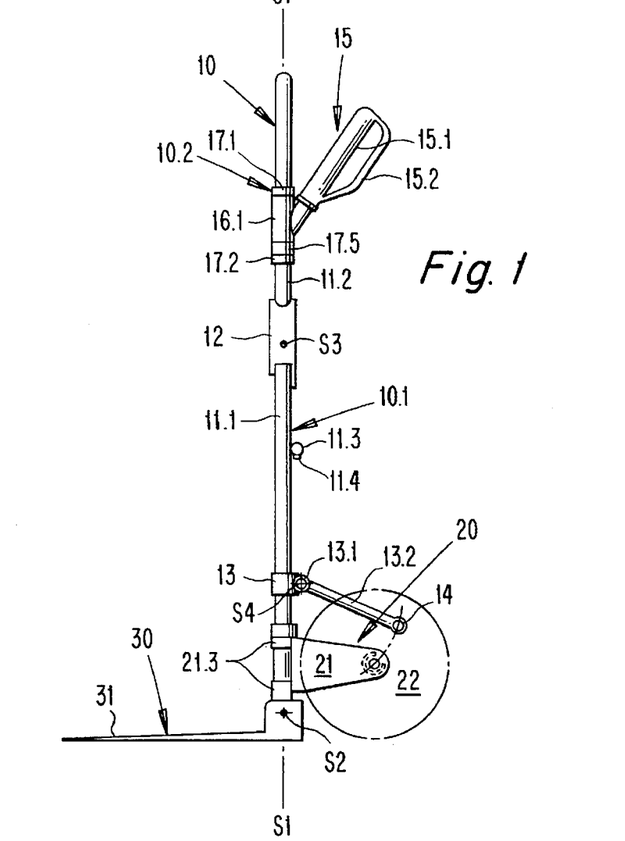
FIG. 1 is a side view of the trolley.

FIG. 1 shows a trolley in a side view. A handle frame 10 carries a mobile frame 20 on its lower end and a support plate or shovel 30 for accepting the load. The mobile frame 20 is formed of wheel carriers 21 provided with wheels 22, each of which is mounted by wheel carrier casings 21.3 for rotation about a vertical first swivelling axis S1 defined by lower portions 11.1 of the longitudinal sections of the vertical frame 10 so that the wheel carriers 21 can swivel on the longitudinal sections. The shovel 30, having a shovel blade 31 and shovel back 32 (FIG. 8) can be swivelled about a horizontal second swivelling axis S2, oriented perpendicular to the longitudinal sections 11.1, 11.2 of the vertical frame 10. The vertical frame forms a lower longitudinal section 11.1 and an upper longitudinal section 11.2, whereby the lower longitudinal section forms a lower vertical frame 10.1 and the upper longitudinal sections 11.2 forms an upper vertical frame 10.2. The lower and the upper sections 11.1, 11.2 are coupled to one another so they can swivel relative to one another about a horizontal third swivelling axis S3, whereby that pivot joint can be secured with a locking bolt 12 in a working position as well as in a rest position. Above the wheel carrier swivelling casing 21.3 of each wheel carrier, the lower vertical frame 10.1 is provided with a socket fitting or sleeve 13 for a connection rod 14, whereby the fitting 13 carries a socket 13.1, that can be swivelled about a fourth swivel axis S4 disposed in a plane parallel to the plane of the vertical frame and oriented perpendicular to the axes of the longitudinal sections 11.1. The free ends of the extension arms 13.2 carry respective ends of the connection rod 14. On the upper longitudinal sections 11.2, pushing handles 15 are mounted. Each handle is fixed to a swivel casing 16.1 mounted for rotation about the axis of one of the longitudinal sections 11.2. The handles 15 are formed as ring handles, which are tilted upwardly and rearwardly (i.e., opposite the direction in which the trolley is to be pushed) from a plane formed by the vertical frame 10, whereby the tilted angle lies in the range of approximately 30° to 45°.

Figure 2:
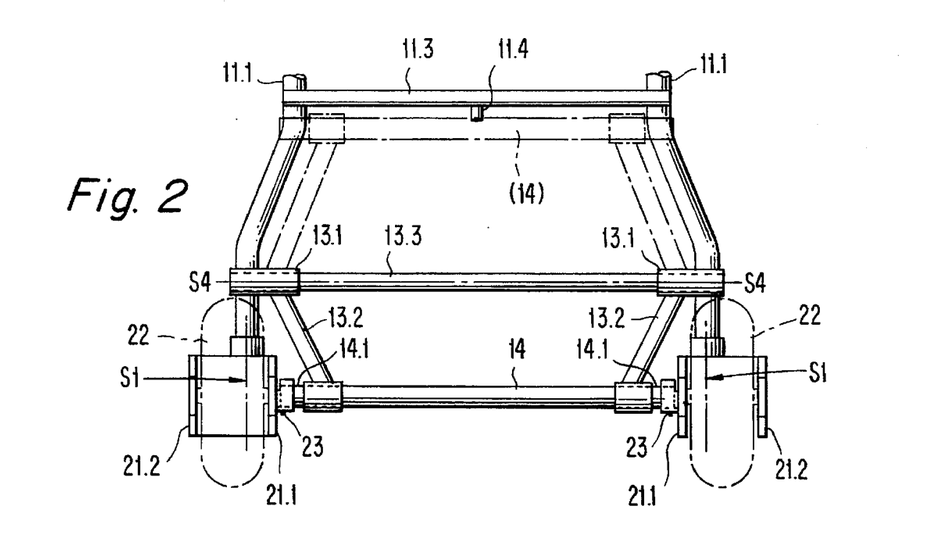
FIG. 2 depicts the mobile frame of the trolley with connection rod in the working position (dotted lines show the arrested position)
Figure 3A:
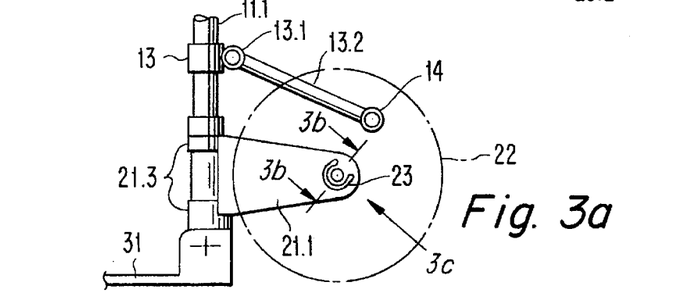
FIG. 3a depicts the side view of connection rod with cylindrical end piece and fitting pin.
Figure 3B:
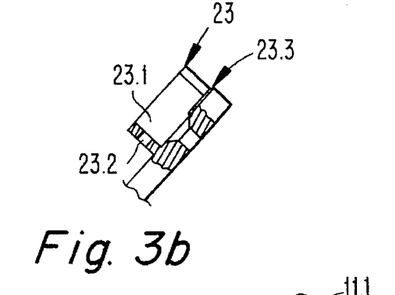
Figure 3C:
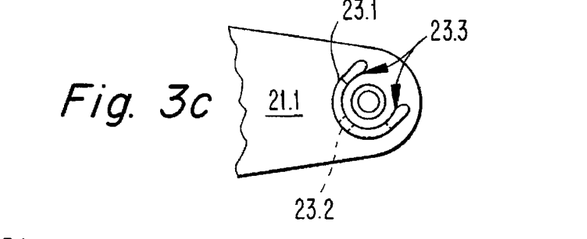
Figure 4A:
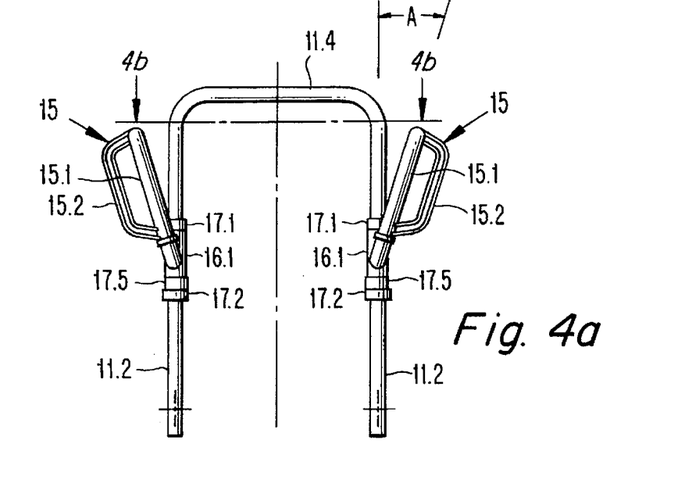
FIG. 4a depicts the rear view of the swiveling handles in working position.
Figure 4B:
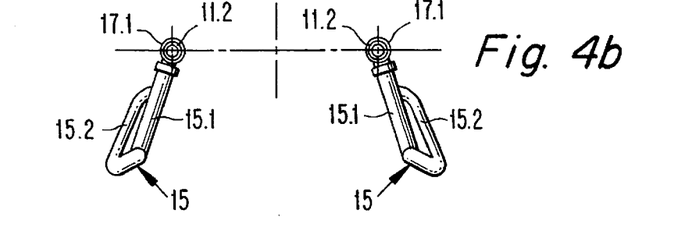

FIG. 2 shows the mobile frame 20 in a rear view; the wheel carriers 21 are set on the lower ends of the lower longitudinal section 11.1, which carriers are provided with wheel prongs 21.1 and 21.2, between which the wheels 22 rotate. The connection rod 14 extends parallel to the swivelling axis S4 and swivels about that axis. Both sockets 13.1 of the extension arm 13.2 are interconnected by means of a transverse brace 13.3. The connection rod 14 is swivelled to a lower position between the wheel carriers (solid-line depiction in FIG. 2) and connects to the inner prongs 21.1 of the wheel carriers 21, so that the wheel carriers 21 are held in a swivelled-out position, i.e. a position oriented perpendicular to the plane of the frame 10. For this, stoppers or receivers 23 provided on the inner side of the inner prongs 21.1 of the wheel carriers 21 serve to accept respective ends of the connection rod 14. This stopper is shown in more detail in FIGS. 3a–3c. Cylindrical ends of the connection rod 14 can be pressed into the stoppers 23, whereby the wall 23.1 of the stopper 23 encompasses a cylindrical end by a little more than 180° and so produces a frictional connection between the end surfaces of the connection rod 14 and the stopper surfaces of the inner prongs 21.1.

Figure 5A:
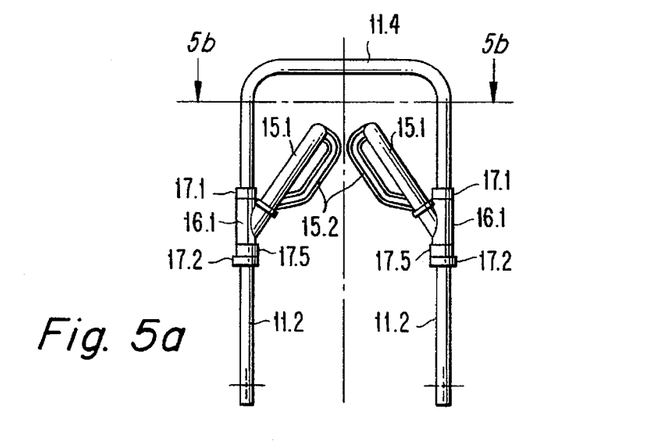
FIG. 5a is a rear view of the swiveling handles.
Figure 5B:
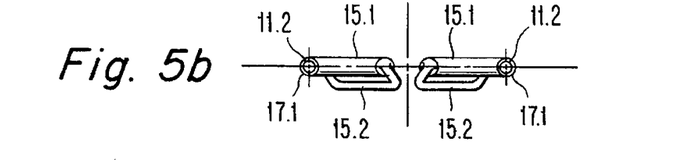
Figures 6A, 6B, 6C:
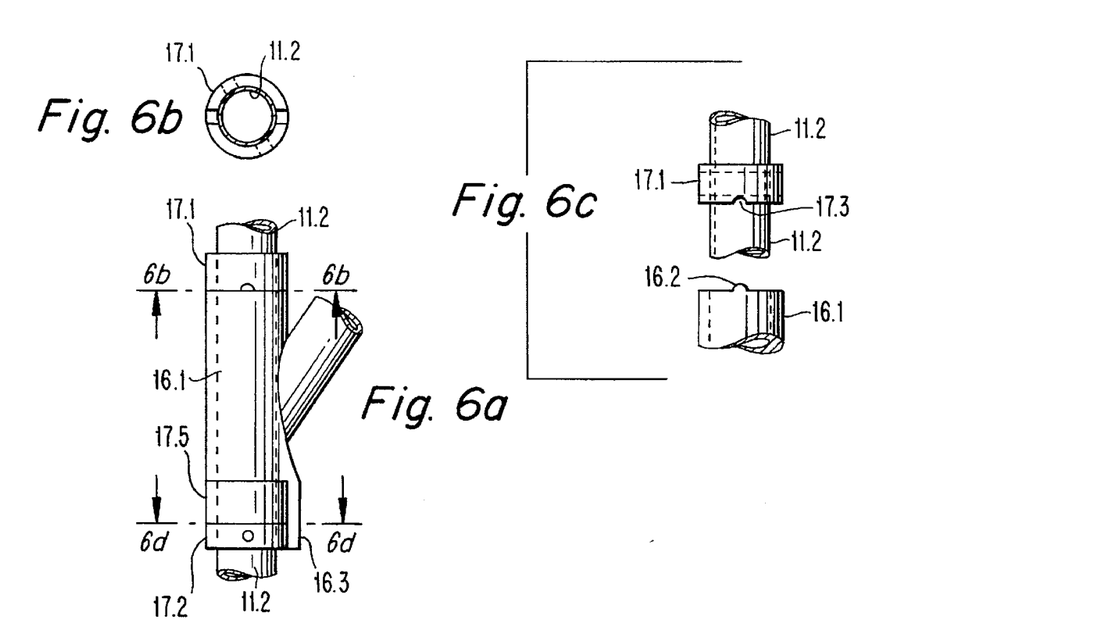
Figure 6D:
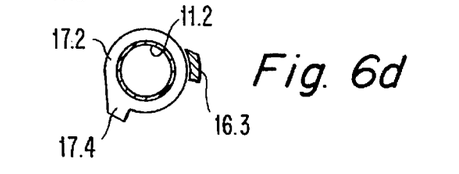

FIGS. 4a, 4b and 6a–6d show the design of the pushing handles 15 which are designed as ring handles, so that the pushing hands of the person conducting the transport can transfer a force to the trolley. The actual handles 15.1 are provided with a haptic-favorable coating and outfitted with a protective hand frame 15.2 including a ring, so that the backs of the hands are protected when pushing the trolley. This formation of the handles and their tilted orientation, as is shown in the working position in FIGS. 4a, 4b, contribute to ergonomically favorable ratios, so that the movement of a fully loaded trolley does not lead to excessive strain on the hands and the joints transferring the pulling force of the body. In the rest position depicted in FIGS. 5a, 5b, the handles are folded-in at the upper part of the vertical frame and lie mainly in the plane of the vertical frame; the protective hand frames 15.2 may extend slightly out of that plane. The swivelling casing 16.1 of each handle is held between an upper socket ring 17.1 and a lower socket ring 17.2 (see FIGS. 6a–6d). The upper socket ring 17.1 has openings 17.3 formed in its lower side facing the swivelling casing 16.1, and in which the locking projections 16.2 provided on the corresponding top side of the swivelling casing 16.1 engages, when the correct position of the handle 15 is achieved. Such opening can be provided in the working position as well as the rest position. An elastic flexible spacer 17.5, which is disposed between a lower side of the swivelling casing 16.1 and the top side of the lower socket ring 17.2 gives the swivelling casing 16.1 sufficient space to move vertically for the catching and releasing of the projections in the openings and elastically holds the projections in the openings. To obtain a certain arrangement in the working position, the swivelling casing 16.1 is provided with a locking finger 16.3, which abuts a radially extending projection 17.4 of the lower socket ring 17.2 in the swivelled-out position. This mechanical locking of the swivelling movement secures the perfect positioning of the handle 15 through the orderly setting of the locking finger 16.3 on the projection 17.4 and allows an orderly transference of the force.

Figures 7, 8:
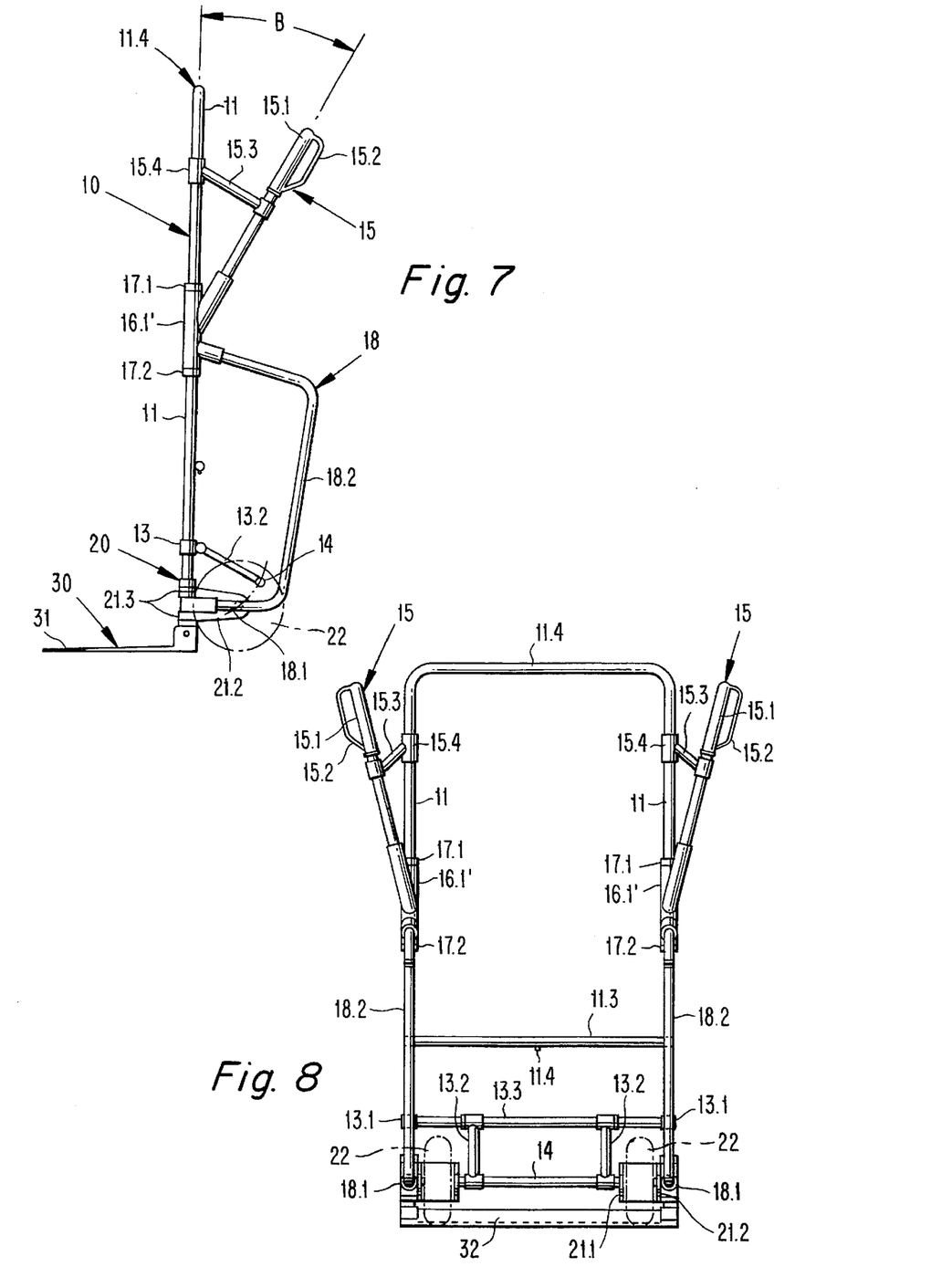
FIG. 7 is a front view of the trolley with sliding frame.
FIG. 8 is a side view of the trolley with sliding frame.
Figure 9:
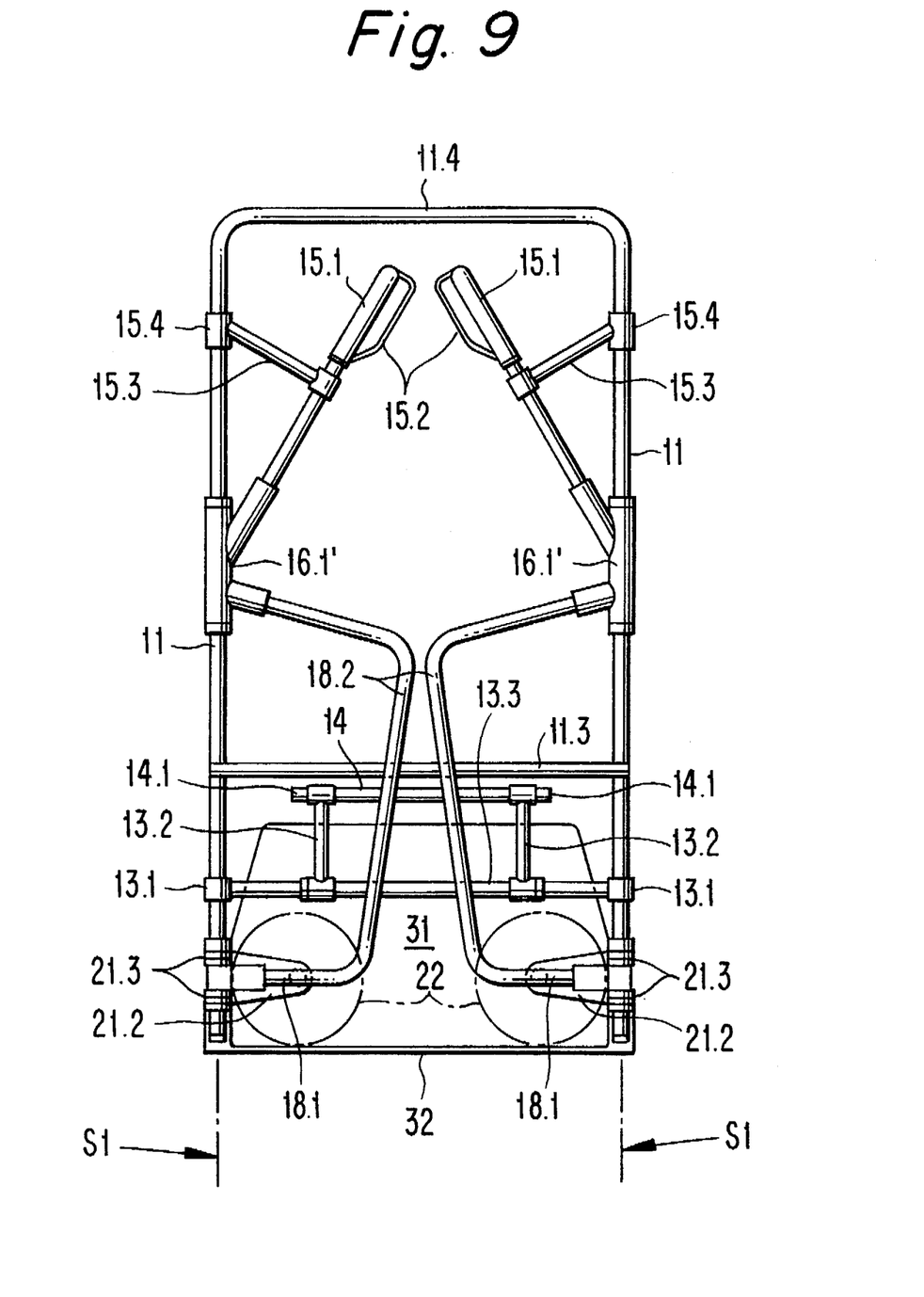
FIG. 9 is a front view of the trolley in a collapsed position.

Another embodiment is depicted in FIGS. 7 through 9 wherein both wheel carriers 21 are provided with a swivel frame 18, and each of these swivel frames 18 is supported to the corresponding longitudinal section 11, by swivelably mounting a lower end 18.1 of each frame 18 to a longitudinal section 11, and fixing an upper end of the frame 18 to a swivelling casing 16.1'. This frame 18 is arranged with its lower end 18.1 to the outside of the outer prongs 21.2 of the wheel carriers 21, so that a collision with the connection rod 14 is eliminated. Also, the frame 18 is configured to establish a transition from the wheel 22 to the runner part 18.2 of the frame 18. That is, as can be seen in FIG. 7, the runner part 18.2 represents a somewhat tangential progression of the wheel 22, so that a transition from rolling on the wheel to gliding on the runner part 18.2 is made possible in a simple way, in particular for traversing steps or stairs, whereby the wheel carriers 21 and also the sliding runner 18.2 is secured forcibly by the connection rod 14 positioned in between the wheel carriers.

When folded up, the shovel 30 protects the swivelled-in wheel carriers 21 and wheels 22 by means of the shovel blade, while the shovel back 32 lies protectively against the wheel tires and, if needed, holds the swivelled-in wheels 22 in a clamping manner shown in FIG. 9 (this is also true of the embodiment of FIGS. 1 through 6).

The handles 15 and frame 18 are mounted to the swiveling casings 16.1', whereby the frame 18 is swiveled out to the unfolded position in response to a swiveling of the handles 15 to their operative position for being pushed.

If it is desired to be able to fold (pivot) the upper half of the frame onto the lower half of the frame, a suitable horizontal pivot axis would be provided between the upper and lower halves. Also, each swiveling casing 16.1' would have to be made in separate pieces, i.e., one piece for connection to the handles 15, and the other piece for connection to the frame 18. The piece to which the frame 18 is connected would be situated below the horizontal pivot axis so that the frame 18 would not interfere with the folding. The folding would be performed such that the upper and lower halves are not folded coplanar within one another, but rather to spaced, parallel positions.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A collapsible hand-operated trolley comprising:
   a frame;
   a support plate mounted on a lower portion of said frame and swivelable about a substantially horizontal first axis between folded-down and folded up positions;
   manual gripping portions disposed on an upper portion of said frame;
   a pair of horizontally-spaced wheel carriers disposed at a lower end of the frame, each wheel carrier being rotatable about a substantially vertical second axis between a folded-out operable position and a folded-in storage position; and
   a connection rod mounted to the frame for rotation about a substantially horizontal axis oriented substantially parallel to said first axis between a securing position wherein it extends between said wheel carriers when said wheel carriers are disposed in said folded-out positions, to prevent said wheel carriers from being folded-in.

2. The trolley according to claim 1, wherein said lower portion of said frame includes a pair of substantially vertical bars, a pair of substantially horizontally oriented sockets mounted on respective bar, said connection rod rotatably mounted in said sockets.

3. The trolley according to claim 1, wherein each of said wheel carriers carries a structure for connecting to a respective end of said connecting rod in response to rotation of said connecting rod to said securing position.

4. The trolley according to claim 3, wherein each wheel carrier includes outer and inner prongs between which a wheel is rotatably mounted, each inner prong being provided with said structure for receiving an end of said connecting rod.

5. The trolley according to claim 4, wherein each of said structures comprises a receiver into which an end of said connecting rod can be press fit.

6. The trolley according to claim 5, wherein each of said structures comprises a circular receiver having an opening into which an end of said connecting rod can be frictionally pressed.

7. The trolley according to claim 6, wherein each receiver is of generally cylindrical shape and includes an interruption through which an end of said connecting rod can travel.

8. The trolley according to claim 7, wherein said cylindrical receiver is formed by an elastic wall.

9. The trolley according to claim 8, wherein the receiver retains the connecting rod therein.

10. The trolley according to claim 1, wherein each wheel carrier includes outer and inner prongs between which a wheel is rotatably mounted, each inner prong including a projection for receiving a free end of said connecting rod.

11. The trolley according to claim 1, wherein said connecting rod includes openings for receiving projections formed on said wheel carriers.

12. The trolley according to claim 10, wherein each projection grips said respective end of said connecting rod.

13. The trolley according to claim 1 further including a pair of swivelling frames swivelably connected to said frame and to respective wheel carriers, said swivelling frames disposed to the outside of a respective wheel carrier when said wheel carrier is in its folded-out position.

14. The trolley according to claim 4, wherein each swivelling frame includes an upper end pivotably mounted to said frame.

15. The trolley according to claim 14, wherein each swivelling frame includes a lower end pivotably mounted to said frame.

16. The trolley according to claim 1, wherein said manually gripping portions comprise rings arranged to swing about a substantially vertical axis between folded-in and folded-out positions.

17. The trolley according to claim 16 further including retaining members mounted on said frame for yieldably retaining said manually gripping portions in said folded-out positions.

18. The trolley according to claim 17, wherein the retaining members comprise projections carried by the frame, and recesses carried by the manual gripping portions, and a biasing member yieldably biasing the projection and recess together.

19. The trolley according to claim 1, wherein the gripping portions are swingable between a folded-out operative position and folded-in storage position, and a stop structure for defining said folded-out operative position.

20. The trolley according to claim 1, wherein said manual gripping portions are mounted on respective sleeves which are rotatable about substantially vertical axis between folded-in and folded-out positions; further including a pair of swivelling frames swivelably connected to said frame and to respective wheel carriers, said swiveling frames being fixed to said sleeves.

21. The trolley according to claim 20 further including a further support for supporting the manual gripping portions, one end of each support including a sleeve rotatably mounted on said frames.

* * * * *